United States Patent [19]

Nakamoto et al.

[11] 4,380,924
[45] Apr. 26, 1983

[54] METHOD FOR MONITORING FLOW CONDITION OF LIQUID METAL

[75] Inventors: Koichiro Nakamoto; Kiyokazu Ishii; Nobumi Ohyama, all of Mito, Japan

[73] Assignee: Doryokuro Kakunenryo Kaihatsu Jigyodan, Tokyo, Japan

[21] Appl. No.: 254,664

[22] Filed: Apr. 16, 1981

[30] Foreign Application Priority Data

May 2, 1980 [JP] Japan .................. 55-59002

[51] Int. Cl.³ .................. G01F 1/58; G01N 27/74
[52] U.S. Cl. .................. 73/19; 73/861.11; 324/204
[58] Field of Search .................. 73/19, 61 LM, 861.06, 73/861.11; 324/204

[56] References Cited

U.S. PATENT DOCUMENTS 3,824,456  7/1974  Wiegand ............... 73/861.11
3,967,500  7/1976  Forster ................ 73/861.06
4,144,741  3/1979  Nakamoto et al. ....... 73/861.11 X
4,145,924  3/1979  Müller ................ 73/861.06

*Primary Examiner*—Charles A. Ruehl
*Attorney, Agent, or Firm*—Wenderoth, Lind & Ponack

[57] ABSTRACT

A method for monitoring flow condition of a liquid metal which employs a detector consisting of an excitation coil applied with an a.c. current and at least two detection coils disposed on both sides of said excitation coil. The detector is disposed in the flowing direction of the liquid metal and a peak point of the cross-correlation function of fluctuation signals occurring in said detection coils is examined. By detecting the moving direction, the polarity and the magnitude of the peak point, the flow condition can be comprehensively ascertained, such as a change in flow velocity, a change in void fraction, the presence of voids and transit velocity of void.

5 Claims, 4 Drawing Figures

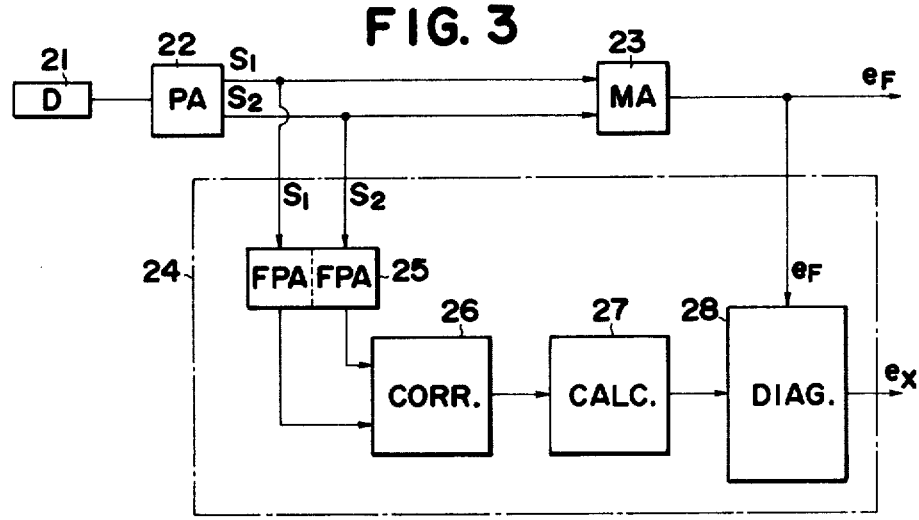
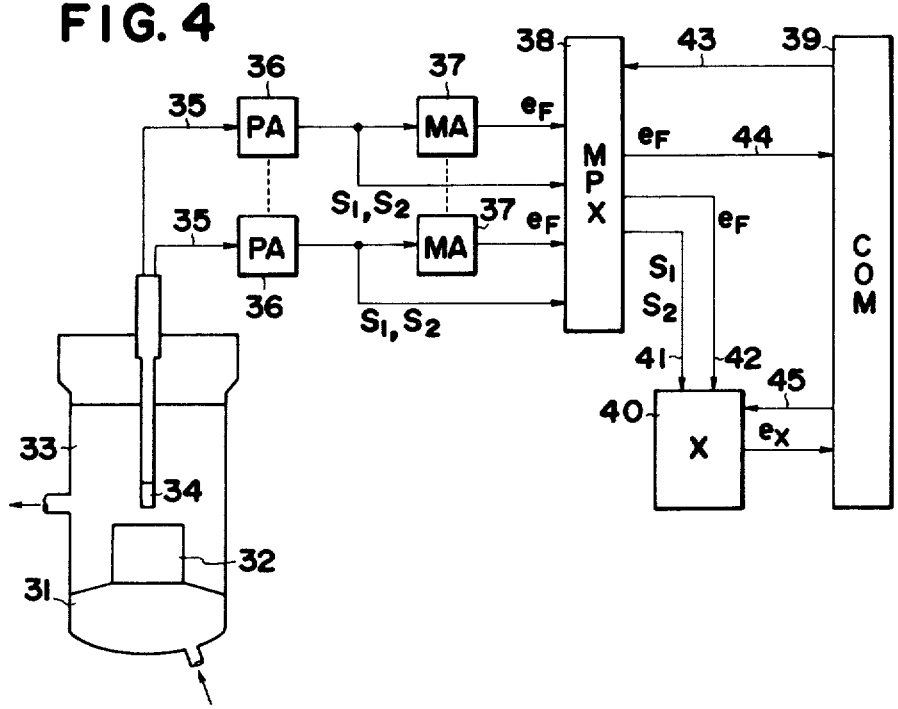

METHOD FOR MONITORING FLOW CONDITION OF LIQUID METAL

BACKGROUND OF THE INVENTION

This invention relates to a method which makes it possible to ascertain the flow condition of a liquid metal comprehensively from a moving direction or the like of a peak point of a cross-correlation function of fluctuation signals occurring in the outputs of an electromagnetic sensors disposed in the flowing liquid metal. Though not restricted, in particular, the present invention relates to a method which is especially suited for characteristic measurement (flow velocity measurement) of a core of aliquid metal cooled nuclear reactor, core anomaly detection and diagnosis of anomaly cause (void detection, detector self-calibration/diagnosis), and the like, by way of example.

An eddy current flow sensor, for example, has heretofore been known as an instrument for electromagnetically measuring the flow velocity of an electrically conductive fluid.

Such a flow sensor employs, as illustrated in FIG. 1, a detector 7 which consists of an excitation coil 6 and two detection coils 4, 5 disposed on both sides of the excitation coil 6 (that is, a 3-coil type), and the detector 7 is placed in the flowing direction of a conductive fluid. A so-called 5-coil type has also been known in which excitation coils are further disposed outside the detection coils. In any case, an a.c. magnetic field generated by the excitation coil 6 is such that the magnetic flux $\phi$ is distributed symmetrically with respect to the axis when the fluid F is static (curve 1). When the fluid F moves in the direction indicated by an arrow, however, the magnetic flux $\phi$ is deformed on the downstream side (curve 2). Accordingly, a voltage $S_1$ induced in the detection coil 4 on the upstream side decreases with an increase in the flow velocity but increases with a decrease in the flow velocity, whereas a voltage $S_2$ induced in the detection coil 5 on the downstream side exhibits the reverse behavior with respect to the voltage $S_1$. The difference between $S_2$ and $S_1$ provides a signal depending upon the flow velocity, i.e. a flow velocity signal $e_F$. This is the principal of measurement in the conventional flow sensor.

However, "fluctuation" exists in the output $S_1$ and $S_2$ of the detection coils 4 and 5, respectively, and this fluctuation pulsates with respect to the time averaged signal. By determining the cross-correlation function $R_{1,2}(\tau)$ of fluctuations of $S_1$ and $S_2$, one of the inventors of the present invention found that the flow velocity could be obtained by dividing the effective distance L between both detection coils by a delay time $\tau_o$ at the peak point of $R_{1,2}(\tau)$, on the basis of the concept that the delay time $\tau_o$ is inversely proportional to the flow velocity. As a result, one of the inventors of the invention proposed a novel flow sensor (Japanese Patent Laid-Open No. 128363/1978). In accordance with this system, the flow velocity can be obtained irrespective of the magnitude of the signal itself and hence, it can be applied to self-calibration of the flow sensor. Since only the flow velocity is taken into consideration, however, no method has yet been found which makes it possible to comprehensively ascertain the flow condition including the state of voids.

There has conventionally been known a void detection method which detects the voids using the magnitude of an r.m.s. (root mean square) value of fluctuation of the flow velocity signal. However, this method involves the drawbacks that disturbance, which has no relation to the voids, cannot be eliminated and consequently, the level of background noise is likely to become greater, thereby lowering the void detection sensitivity.

On the contrary, in the field of liquid metal cooled nuclear reactors, for example, development of such a method has been eagerly required which makes it possible to accurately ascertain the flow condition of a liquid metal by associating flow velocity detection with void detection, for monitoring the flow velocity in a fuel subassembly, for detecting core anomaly or for diagnosing the cause of such anomaly, and moreover, which method enables self-diagnosis of the detector.

SUMMARY OF THE INVENTION

It is therefore an object of the present invention to provide a method of monitoring the flow condition of a liquid metal, which makes it possible to simultaneously detect the flow velocity and voids in the liquid metal in association with each other.

It is another object of the present invention to provide a method which makes it possible to properly detect the flow condition of a liquid metal by detecting the flow velocity of the liquid metal and at the same time, measuring the presence or absence of voids with correlation method, the void fraction, the change in the flow velocity, and so forth.

It is still another object of the present invention to provide a method of monitoring the flow condition of a liquid metal which makes it possible to comprehensively ascertain the flow condition and to carry out self-diagnosis of faults of a detector.

Now, assuming that the conductivity substantially decreases due to the presence of voids in an electrically conductive fluid, by way of example, eddy current flowing through the fluid decreases so that the magnetic flux $\phi$ in the detection coils 4, 5 increases as represented by a curve 3 in FIG. 1. Accordingly, both voltages $S_1$, $S_2$ induced in the detection coils 4, 5 increase.

The inventors of the present invention paid specific attention to the fact that, whereas the increment or decrement in $S_1$ and $S_2$ resulting from the flow velocity is reverse (or has the opposite polarity) to each other, the increment or decrement of $S_1$ and $S_2$ resulting from the voids is the same (or has the same polarity) to each other. Thus, the inventors realized that various informations relating to the flow condition of the fluid could be obtained from the abovementioned phenomenon by determining the cross-correlation function $R_{1,2}(\tau)$ of fluctuations of $S_1$ and $S_2$. The present invention was accomplished on the basis of this conception.

FIG. 2 shows a diagram of the cross-correlation function $R_{1,2}(\tau)$ of fluctuations of the output $S_1$ and $S_2$ of the detection coils, and represents the delay time between $S_1$ and $S_2$. By the way, as to the flow velocity when no void exists, local disturbance of the velocity existing in the turbulent flow moves in the downstream direction along with the fluid and a change in the opposite polarity takes place between $S_1$ and $S_2$ as hereinbefore described. Therefore, $R_{1,2}(\tau)$ exhibits negative correlation and describes a curve such as a curve 11 in FIG. 2. The delay time $\tau_o$ at a point A, at which the absolute value of $R_{1,2}(\tau)$ becomes maximum, is inversely proportional to the flow velocity, so that the flow velocity can be obtained by dividing the effective length L between the detection coils by $\tau_o$. This is the principle of the aforementioned eddy current flow sensor that was previously proposed by the inventors of the present invention. According to this invention, the following informations can be obtained additionally:

(1) In the case where voids exist:

When the voids move along with the flow, fluctuations occur in the outputs $S_1$, $S_2$ of the detection coils. As described in the foregoing, since the voids are found to cause a change of the same polarity in both $S_1$ and $S_2$, the cross-correlation function $R_{1,2}(\tau)$ takes a positive value such as shown by a curve 12 in FIG. 2. If no void exists, the cross-correlation function takes a negative value as shown by the curve 11 in FIG. 2. Thus, presence or absence of the voids can be determined by detecting the polarity of the peak point of $R_{1,2}(\tau)$. According to this method, non-correlated informations are reduced to minimum and can be distinguished from a fluctuation signal due to flow fluctuation by means of the fact that the polarity of $R_{1,2}(\tau)$ is opposite. Accordingly, this method can improve the void detection sensitivity in comparison with the aforementioned conventional method that employs the r.m.s. value of fluctuation of the flow velocity signals.

With the increase in the void fraction, the curve 12 increases such as represented by a curve 13 in FIG. 2. Namely, the point A moves in the positive direction (direction of C) due to mixture of the voids and its magnitude depends upon the void fraction. Accordingly, the void fraction can be detected by the magnitude of the peak point of the positive polarity. As the void fraction becomes greater, the peak value $(P'C = |R_{1,2}(\tau_o')|)$ of $R_{1,2}(\tau)$ becomes sufficiently greater than a value $(PA = |R_{1,2}(\tau_o)|)$ when the voids are absent. Hence, the moving speed of the voids can be obtained by dividing the effective distance L by a delay time $\tau_o'$ that provides the positive polarity peak point C of the curve 12. A slip ratio can be determined by comparing this void speed with the flow velocity.

(2) Ascertaining the flow condition:

When the flow velocity simply increases, fluctuation due to the turbulent flow also increases whereas the delay time becomes smaller so that the point A shifts to the point B'. On the contrary, when the flow velocity decreases, the point A shifts to the point B". When only the turbulence of the flow increases due to changes in the wall surface conditions of a flow channel without any change in the averaged flow velocity, the point A moves to the point B. When the voids mix, the point A moves to the point C, as described above. Accordingly, the flow condition can be determined by examining in which direction and to which extents the peak point A of the cross-correlation function moves.

(3) Self-diagnosis of the detector fault:

Anomaly of an electronic circuit or of the coils can be discriminated by comparing (e.g. dividing) the flow velocity signal $e_F$ resulting from the ordinary operation method of the detector with a flow velocity $e_o$ obtained from the delay time $\tau_o$ that provides the peak point A of the cross-correlation function of $S_1$ and $S_2$. In other words, though the change in the exciting current or in the impedance of the detection coils results in changes in the output $e_F$ of the flow sensor, it does not cause any change in the peak position $(\tau_o)$ of $R_{1,2}(\tau)$. For this reason, it is possible to discriminate between the fault or anomaly of the detector and the change in the flow velocity itself by determining whether or not the ratio between $e_F$ and $e_o$ is equal to a predetermined value.

As described above, from the changes in the position (delay time $\tau_o$) and in the magnitude (intensity of correlation PA) of the peak point A of the cross-correlation function $R_{1,2}(\tau)$ of fluctuations of the detection coil outputs $S_1$ and $S_2$, it is possible to obtain all informations not only of the flow velocity but also of the absence or presence of the voids in the fluid, of the flow condition and of the self-diagnosis of the detector.

BRIEF DESCRIPTION OF THE DRAWINGS

FIG. 3 is a block diagram of a system for practising the method of the present invention; and FIG. 4 is a block diagram when the method of the present invention is applied to a monitoring system for a liquid metal cooled nuclear reactor.

PREFERRED EMBODIMENTS OF THE INVENTION

Figure 1:
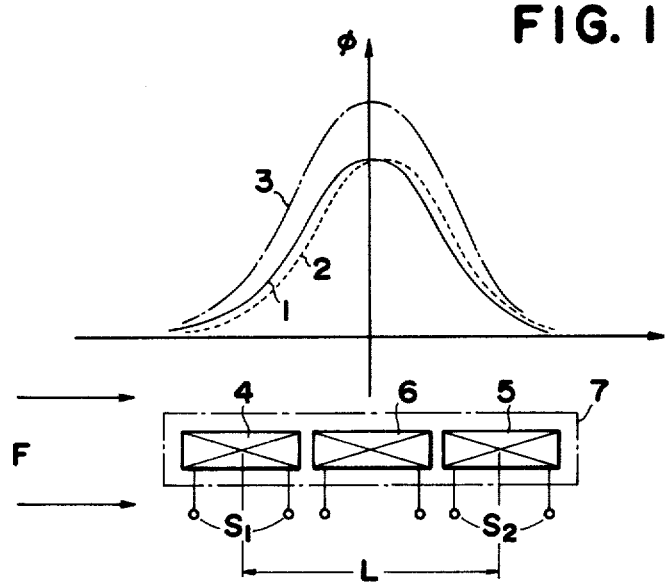
FIG. 1 is a diagram illustrating the principle of a prior art eddy current flow sensor.

Now, FIG. 3 shows a specific embodiment of the construction of the equipment required for practising the method in accordance with the present invention. The output of a detector (D) 21, which accommodates therein an excitation coil and detection coils disposed as shown in FIG. 1, is generally amplified by a pre-amplifier (PA) 22. The difference between the detection coil signals $S_1$ and $S_2$ after amplification is obtained by a main amplifier (MA) 23 and is generated as a flow velocity signal $e_F$. This construction is the same as the prior art construction. The portion represented by reference numeral 24 relates to the subject matter of the present invention, and is equipped with fluctuation signal pre-processing amplifiers (FPA) 25, a correlator (CORR) 26, a calculation circuit (CALC) and a diagnosis circuit (DIAG) 28. The output $S_1$ and $S_2$ from the pre-amplifier 22 are branched into the fluctuation signal pre-processing amplifiers 25 to select the fluctuation signal of a necessary frequency band and to amplify the weak fluctuation signal to sufficiently high intensity. Thereafter, the cross-correlation $R_{1,2}(\tau)$ of both signals is obtained by the correlator 26, and the delay time $\tau_o$ of the peak point and the change in the magnitude of the peak point are calculated from $R_{1,2}(\tau)$ by the calculation circuit 27. The flow velocity $e_o$ is also calculated from $\tau_o$. In the diagnosis circuit 28, the following diagnoses (i) and (ii) are carried out using the flow velocity value $e_o$ and the magnitude of the peak point from the calculation circuit 27 and the flow velocity signal $e_F$ on the basis of the conventional operation method, and output ($e_x$) are then produced for external apparatuses (e.g. a computer and various displays):

(i) $e_F/e_o = k$ is determined, and using this as the calibration coefficient, the eddy current flow sensor is self-calibrated. If the k value becomes remarkably greater than the initial value and the change is greater than the expected drift or change in characteristics with time of the detector, the following item (ii) is evaluated. If the change does not result from the voids, the detector is diagnosed as abnormal.

Figure 2:
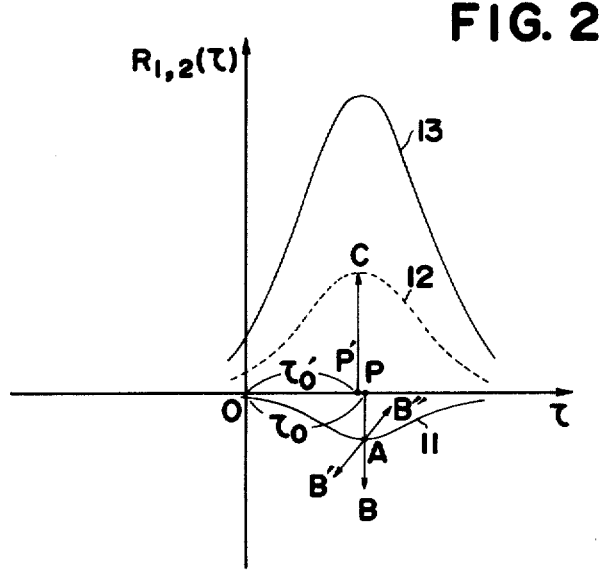
FIG. 2 is a diagram illustrating a cross-correlation function as the basis of the method of the present invention.

(ii) Presence or absence of the voids (or the void ratio) is measured from the movement of the peak point (point A in FIG. 2) of the correlation function. If necessary, the moving speed of the voids is measured. Also, changes in the flow condition are descriminated.

FIG. 4 shows another embodiment in which the method of the present invention is applied to a core monitoring system for a liquid metal cooled reactor. The core 32 of a reactor vessel 31 has high power density and the temperature of liquid sodium 33 as a coolant is high so that fuel assemblies must individually be monitored for the sake of safety. Instruments 34, such as thermometers and flow sensors, are generally equipped above the core for this purpose. If eddy current flow sensors are employed as one of the above-core instrumentation, the signals from the detectors reach each pre-amplifier (PA) 36 through lead wires 35, and the flow velocity signals $e_F$ are produced from main amplifiers (MA) 37. Generally, these outputs $e_F$ are sequentially scanned by a multiplexor (MPX) 38 and is delivered to a computer (COM) 39 through a line 44. The construction described so far is the same as the prior art construction.

When the present invention is applied, the pre-amplifier outputs (detection coil signals $S_1$, $S_2$) are directly connected to the multiplexor 38 and are transmitted together with the flow velocity signal $e_F$ to a core monitoring system (X) 40 through lines 41, 42, respectively, so that the operation of the multiplexor 38 is as a whole controlled by the computer 39. The core monitoring system 40 corresponds to one that is represented by reference numeral 24 in FIG. 3. In FIG. 4, the number of detectors 34 is generally from some dozens to some hundreds and corresponds to the number of the fuel subassemblies. Accordingly, the numbers of the pre-amplifiers 36 and of the main amplifiers 37 are the same as these numbers. However, since the multiplexor 38 can sequentially scan a large number of signals, the output from the multiplexor may be at least one channel, and several channels at the most, for each line of 41, 42 and 44. Therefore, the number of the core monitoring system 40 of the present invention may be at least one, and maximum several sets, in order to increase the processing speed and to realize redundancy.

As described in the foregoing, the core monitoring system in the present invention provides a large quantity of informations advantageous for reactor safety and for reactor operation and monitoring. Generally, however, the data processing procedures are rather time-consuming so that the following procedures are preferably employed for practical applications:

(a) During normal operation:

The flow velocity signals $e_F$ from the several dozens or several hundreds main amplifiers 37 are sequentially scanned by the multiplexor 38 and are fed into the computer 39, but are not applied to the core monitoring system 40. This is the same as the conventional system.

(b) Periodic inspection and calibration of detector:

These must be conducted in a predetermined period (e.g. one week to several months). Since these procedures are not related to the reactor safety, a longer measuring time should be taken (several minutes for each subassembly) in order to sufficiently enhance the measuring accuracy. The signals from the detectors located at the outlet of each subassembly of the core are sequentially scanned by the multiplexor 38 on the basis of command 43 from the computer 39, so that the outputs $S_1$, $S_2$ of the pre-amplifiers 36 and the output $e_F$ of the main amplifiers 37 are delivered to the core monitoring system 40, and calibration and fault diagnosis of the corresponding detector are carried out for each subassembly. The results are delivered to the computer 39 for calculating the core characteristics or for display for an operator.

(c) Core anomaly monitoring:

As described in the time (a), "During normal operation", the flow sensor output $e_F$ is sequentially scanned for each subassembly thereby to display the flow velocity of the coolant flowing through each subassembly.

Separately, the detection coil signals $S_1$, $S_2$ of each flow sensor and the flow velocity signal $e_F$ are delivered to the core monitoring system 40 in the sequency of each subassembly. From the $e_F/e_o$ ratio and the moving direction and magnitude of the peak point of $R_{1,2}(\tau)$, therefore, determination such as the presence or absence of the detector fault, anomaly of the flow rate (or flow velocity) of the coolant for the subassembly and early detection of the fuel pin failure by void detection can be effected, and their outputs are applied to the computer. Since the core monitoring system of the invention has a relatively long processing time, it is also possible to input and analyze the detector outputs $S_1$, $S_2$ of a corresponding subassembly to and by the core monitoring system 40 via the multiplexor 38 on the basis of the commands 43, 45 from the computer 39 only when any anomaly is observed in the flow sensor output $e_F$, instead of imputting the data each time to the monitoring.

Because safety operation and monitoring of the core can be inclusively carried out by the core monitoring system of the invention as described above, early detection of anomaly can be made and reliability of anomaly detection can be enhanced markedly.

As described in the foregoing, the present invention is so constructed as to detect the position, polarity and magnitude of the peak point of the cross-correlation function of fluctuations of each detection coil output. Therefore, it is possible to measure the flow velocity of the liquid metal in the associated manner with detection of the voids in the liquid metal. Moreover, the measurement and detection can be carried out simultaneously. Accordingly, the flow condition (change in the flow velocity, change in flow fluctuation, mixing of voids, etc.) can be assayed more properly and measured separately from disturbances (noise etc.) other than the voids. Consequently, in comparison with the conventional method which simply obtains the r.m.s. value of the fluctuation signal, the void detection sensitivity can be greatly improved. When the void ratio is large (more than a few percents), the void velocity can also be measured. Furthermore, fault discrimination of the detector can be made by comparing the flow velocity obtained by the method of the present invention and the flow sensor output obtained by the conventional method. Due to these outstanding features, the present invention can be effectively used for monitoring the flow velocity of the subassembly, for detecting the anomaly and for discriminating the causes of anomaly in a liquid-metal cooled reactor.

While the invention has been described with respect to preferred embodiments, it should be apparent to those skilled in the art that numerous modifications may be made thereto without departing from the spirit and scope of the invention.

What is claimed is:

1. A method for monitoring flow condition of a liquid metal comprising:

disposing in the flowing direction of the liquid metal a detector consisting of an excitation coil applied with an a.c. current and at least two detection coils disposed on both sides of said excitation coil; and detecting the moving direction of a peak point of the cross-correlation function of fluctuation signals occurring in said detection coils to thereby determine a change of flow condition of the liquid metal.

2. The method according to claim 1 wherein the change of flow condition is a change in flow velocity and/or in void fraction of the liquid metal.

3. A method for monitoring flow condition of a liquid metal comprising:

disposing in the flowing direction of the liquid metal a detector consisting of an excitation coil applied with an a.c. current and at least two detection coils disposed on both sides of said excitation coil; and detecting the polarity of a peak point of the cross-correlation function of fluctuation signals occurring in said detection coils to thereby determine the presence or absence of voids.

4. The method according to claim 3 wherein the magnitude of the peak point of the positive polarity is detected to thereby determine void fraction.

5. The method according to claim 3 wherein a delay time to provide the peak point of the positive polarity is detected, and void flow velocity in the liquid metal is determined from the thus detected delay time and a distance L between said detection coils.

* * * * *